Sept. 16, 1952 W. F. BAILEY 2,611,029

DIRECT CURRENT RESTORER FOR MAINTAINING CONSTANT BLACK LEVEL AT CATHODE-RAY TUBE

Filed Jan. 21, 1950

INVENTOR.
WILLIAM F. BAILEY

BY Lawrence B. Dodds

ATTORNEY

Patented Sept. 16, 1952

2,611,029

UNITED STATES PATENT OFFICE 2,611,029

DIRECT CURRENT RESTORER FOR MAINTAINING CONSTANT BLACK LEVEL AT CATHODE-RAY TUBE

William F. Bailey, Valley Stream, N. Y., assignor to Hazeltine Research, Inc., Chicago, Ill., a corporation of Illinois Application January 21, 1950, Serial No. 139,935

5 Claims. (Cl. 178—7.5)

*General*

Figures 2A, 2B, 2C, 2D:
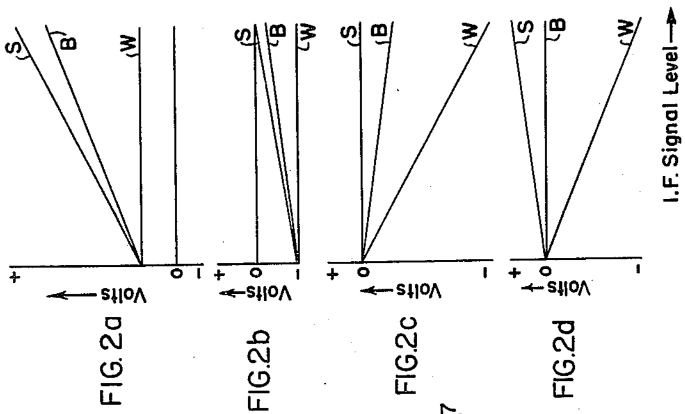

The present invention relates to television receiver signal-translating systems and is particularly directed to the improvement of the contrast-brightness characteristic of such systems. Such systems have special application to a television receiver intended to utilize a negatively modulated carrier-wave television signal and will be set forth in that environment.

In present-day practice, the composite television signal transmitted to a receiver comprises a carrier-wave signal modulated during recurrent trace periods with video-frequency and low-frequency or direct-current components, representing light variations in an image being transmitted and its average background illumination respectively. During intervening retrace periods the carrier signal is modulated with synchronizing-signal components. Where negative modulation is employed, a certain amplitude range of the carrier-wave signal, or up to 75% of the maximum carrier amplitude, is devoted to the transmission of the video information. The lower limit of the modulation range used to transmit video components designates the white level, its upper limit corresponds to the black level, and a decrease in carrier-wave amplitude within the range denotes an increase in illumination. The final portion of the carrier amplitude, from 75 to 100%, is assigned to the transmission of the synchronizing signals including line-frequency components which intervene succeeding line-trace periods and field-frequency components coming between successive field-trace periods. Each synchronizing component extends from the black level of the video signal a fixed amount into the blacker-than-black region. At the receiver, the described composite signal is detected and its video-modulation components are utilized to modulate the intensity of the beam of a cathode-ray type reproducing device. The synchronizing components of signal control scanning apparatus at the receiver and synchronize the scanning of its cathode-ray beam with the corresponding operation of similar apparatus utilized at the transmitter in developing the transmitted signal. In this manner the transmitted image is reconstructed at the receiver.

An important requirement in a properly operating receiver is accurate stabilization of the detected signal with respect to a well-defined signal level, such as the black level or some other predetermined shade level. Stabilization of this type is necessary to facilitate adjusting the reproducing device so that a given signal level or amplitude corresponding to black or some other predetermined shade level is effectively held fixed with respect to its signal input brightness characteristic. This operating requirement is necessary in order that signal components representing any other given shade value at all times appear with the proper value in the reproduced image. Also, where the receiver utilizes alternating-current coupling arrangements between stages, signal stabilization is required in order to ensure that the background illumination component is present in the signal applied to the reproducing device.

Furthermore, the eye of an observer is responsive primarily to the contrast or ratio between illumination values rather than the absolute value of any given shade of illumination. Therefore, it is desirable to provide an arrangement for adjusting the extreme values of illumination in the reproduced image. Such an adjustment is referred to as a contrast control and permits adjustment of the receiver in accordance with conditions of reception and the type of picture being received.

In conventional receivers of one type, signal stabilization is obtained through a diode circuit which peak rectifies the synchronizing components of the detected signal, stabilizing this signal with respect to its synchronizing peaks. Additionally, a gain control is frequently included in one of the video-amplifier stages for effecting contrast regulation. Such an arrangement does effect stabilization but does not preserve the contrast-brightness characteristic of the receiver as uniform as may be desired in certain installations. This is because the black level of a negatively modulated signal is at an amplitude that is appreciably less than the peak amplitude represented by the synchronizing-signal components. Therefore, as the incoming signal intensity varies, the black level tends to deviate considerably with reference to the stabilization level. Accordingly, with such receivers a very accurate gain-control arrangement is required, or adjustment of the brightness control is necessary with variations in signal intensity, if the black level is to be held fixed with respect to the signal input brightness characteristic of the reproducing device.

In another receiver described in a copending application of Arthur V. Loughren, Serial No. 643,288, filed January 25, 1946, entitled "Television Signal-Translating System," contrast control and black-level stabilization is obtained by means of a circuit arrangement which includes in one portion thereof two signal-translating channels. The signals in one of these channels are proportioned to have an amplitude relationship of the order of three to one to those in the other channel. A signal is derived in the other of the channels which is equal in magnitude to but opposite in polarity to the predetermined shade level or black-level signal translated through the one of the channels. A voltage-divider circuit is provided for combining the signals present in these channels to produce a resultant video signal having a black level which is stabilized with respect to variations in the average amplitude of the video signal. Though this type of arrangement is an improvement over the type of arrangement used in conventional receivers and provides a resultant video signal that has a stable black level that does not vary as the incoming signal intensity varies, it is sometimes desirable to obtain more signal gain or an output signal of greater intensity than that obtained from the system just described, when using substantially the same number of amplification stages.

It is an object of the present invention, therefore, to provide a new and improved television signal-translating system which avoids one or more of the above-mentioned limitations of prior arrangements.

It is another object of the invention to provide a new and improved television signal-translating system having an improved contrast-brightness characteristic.

It is a specific object of the invention to provide a new and improved television signal-translating system having an improved black-level signal stabilization arrangement wherein more than one video-frequency amplifier stage may be employed.

In accordance with the invention, a television receiver signal-translating system for translating a video-frequency signal having one amplitude level representative of synchronizing-signal peaks while a predetermined fractional portion of that level is representative of black comprises a source of unidirectional potentials, one thereof being positive with respect to a predetermined reference level and another thereof being effectively negative with respect to this reference level. The system includes a first video-frequency amplifier for translating the video-frequency signal, comprising an electron-discharge device having a plurality of electrodes including an anode, and comprising a potential-isolating impedance coupled between the anode and the positive potential source. The system also includes a potential-divider network including an intermediate terminal and including a pair of terminals one of which is coupled to the anode and the other to the negative potential source, the portion of the network coupled between the negative potential source and the intermediate terminal having an impedance with relation to the total impedance of the network as is the amplitude of the synchronizing signal to the overall amplitude of the video-frequency signal. The system additionally includes a second video-frequency amplifier including an input circuit having at least two signal-translating channels, one thereof being capacitively coupled to the anode of the first amplifier for translating the video-frequency signal developed across the network, and the other of these channels being conductively connected to the intermediate terminal for translating the signal developed in the aforementioned portion of the network and providing a unidirectional potental for the input circuit. Finally, the system includes a signal-stabilizing network comprising a peak-rectifying circuit including a unidirectionally conductive device coupled between the channels and so poled as to conduct upon the application of the peaks of the synchronizing signals thereto and to combine the signals translated in each of the channels, thereby to produce in the aforementioned input circuit a resultant video-frequency signal having a level representative of the aforementioned black level and stabilized so that the last-mentioned black level is substantially independent of variations in the average amplitude of the first-mentioned video-frequency signal.

For a better understanding of the present invention, together with other and further objects thereof, reference is had to the following description taken in connection with the accompanying drawing, and its scope will be pointed out in the appended claims.

Figure 1:
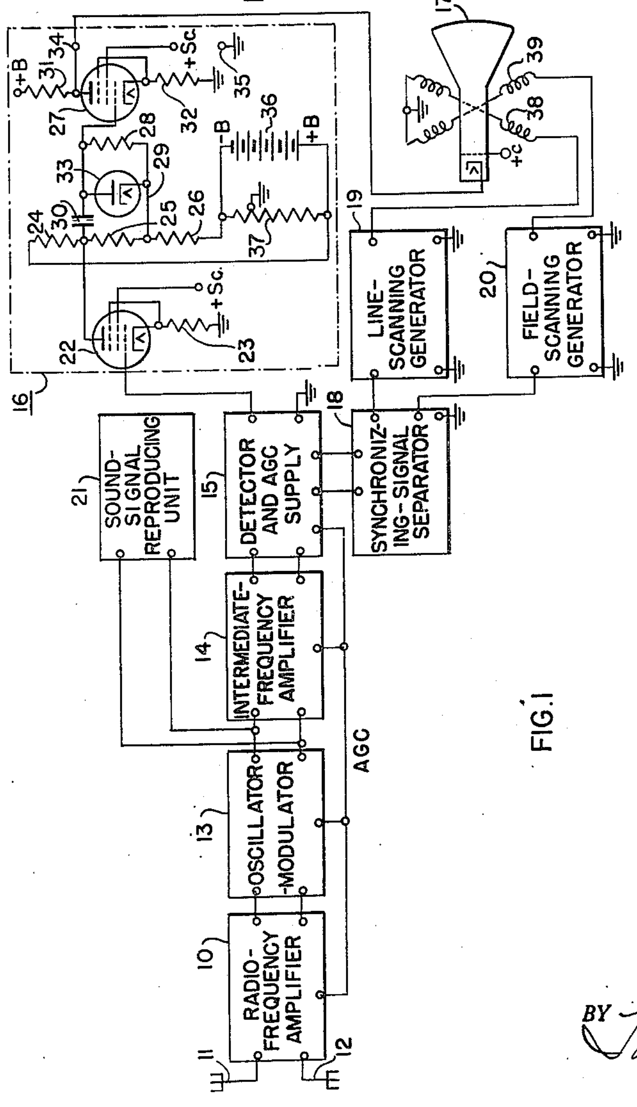

In the drawing, Fig. 1 is a circuit diagram, partly schematic, of a complete television carrier-signal receiver embodying the television signal-translating system of the present invention in a particular form; and Figs. 2*a*–2*d*, inclusive, comprise graphs useful in explaining the operation of the invention.

*Description of television receiver of Fig. 1*

Referring now more particularly to Fig. 1, the television carrier-signal receiver there represented includes a radio-frequency amplifier 10 of any desired number of stages, having its input circuit connected to an antenna system 11, 12 and having its output circuit connected to an oscillator-modulator 13. Coupled in cascade with oscillator-modulator 13, in the order named, are an intermediate-frequency amplifier 14 of one or more stages, a detector and automatic-gain-control or A. G. C. supply 15, a signal-translating system 16 including a video-frequency amplifier and an image-reproducing device 17 of the cathode-ray tube type. Unit 16 is described more particularly hereinafter. There is also coupled to detector 15 a synchronizing-signal separator 18, having output circuits connected to a line-scanning generator 19 and a field-scanning generator 20. The output circuits of these scanning generators, in turn, are connected to appropriate beam-deflecting windings 38, 39 of device 17. The output circuit of the A. G. C. supply included in the detector 15 is connected to the input circuits in one or more of the tubes of radio-frequency amplifier 10, oscillator-modulator 13, and intermediate-frequency amplifier 14 in a conventional manner.

A sound-signal reproducing unit 21 is also connected to the output circuit of oscillator-modulator 13. It may include one or more stages of intermediate-frequency amplification, a detector, one or more stages of audio amplification, and a sound-reproducing device.

*Description of operation of television receiver of Fig. 1*

It will be understood that the various units thus far described, with the exception of signal-translating system 16, may be of conventional construction and operation. The details of such components are well known in the art rendering a further description thereof unnecessary. Considering briefly the operation of the receiver as a whole, and neglecting for the moment the specific operation of unit 16, a desired modulated carrier-wave television signal is intercepted by antenna system 11, 12. This signal is selected and amplified in radio-frequency amplifier 10 and applied to oscillator-modulator 13 where it is converted to an intermediate-frequency signal. The intermediate-frequency signal is selectively amplified in amplifier 14 and is detected by detector 15 to derive the modulation components thereof. These modulation components, which comprise synchronizing components, video-frequency components and direct-current components, are applied to the video-frequency amplifiers of unit 16 for amplification and are thereafter applied to the brilliancy-control electrode of image-reproducing unit 17 to modulate the intensity of the electron beam thereof in accordance with the video-frequency components.

The synchronizing-signal components of the received signal are separated from the video-frequency components in synchronizing-signal separator 18 and are used to synchronize the operation of the line-scanning and field-scanning generators 19 and 20, respectively. These generators produce scanning signals of saw-tooth wave form which are properly synchronized with reference to the received signal and are applied to the deflecting elements 38, 39 of the image-reproducing unit, thereby to deflect the cathode-ray beam of the cathode-ray tube of unit 17 in two directions normal to each other to reproduce the received television image.

The automatic-gain-control or A. G. C. signal derived in unit 15 is effective to control the amplification of one or more of units 10, 13 and 14 to maintain the signal input to detector 15 within a relatively narrow range for a wide range of received signal intensities.

The sound-signal modulated carrier wave accompanying the video-signal modulated carrier wave is also intercepted by antenna system 11, 12. It is selected and amplified in radio-frequency amplifier 10 and applied to oscillator-modulator 13 where it is converted to a sound modulated intermediate-frequency signal. The sound modulated intermediate-frequency signal is applied to unit 21 wherein it is amplified and detected to derive the modulation components which are further amplified and reproduced by the sound-reproducing device.

*Description of signal-translating system of Fig. 1*

Referring now more particularly to the signal-translating system 16 which embodies one form of the present invention, the arrangement there represented comprises a source of unidirectional potentials in which one of the potentials is of one polarity with respect to a predetermined reference level, specifically ground, and in which another of the potentials is effectively of opposite polarity with respect to the same reference level. This source may comprise a battery 36 having terminals indicated as +B and −B and a voltage divider 37 connected therebetween and having a grounded intermediate point providing a predetermined reference level.

The unit 16 also has a first repeater for translating a video signal applied thereto, having an output circuit including an impedance network, part of which is supplied from the source of potentials with a potential of one polarity and another part thereof being supplied from the same source with a potential effectively of opposite polarity. This first repeater comprises a video-frequency amplifier stage including an electron-discharge tube 22 conductively coupled to the output circuit of the detector 15. The tube 22, which may comprise a pentode, includes, among others, an anode, a cathode and a control electrode, the cathode thereof being connected through a bias resistor 23 to ground. The tube 22 also has an output circuit including the anode load circuit thereof comprising an impedance or resistor network of series-connected resistors 24, 25 and 26, having parts thereof supplied with voltages of opposite polarity. In particular, potential +B is supplied through resistor 24 to the anode of tube 22, while resistors 25 and 26 are coupled between the anode and the source of potential −B.

The impedance network 24, 25 and 26 has first and second portions so proportioned that the amplitude of the signal developed in the first portion is a predetermined fraction of the amplitude of the signal developed in the second portion. The resistor 26 comprises the first portion of the network while the resistors 25 and 26 comprise the second portion thereof, the proportioning of the resistors 25 and 26 being such that one-fourth of the amplitude of a signal developed across the resistors 25 and 26 is developed across the resistor 26.

The unit 16 also comprises a second repeater having an input circuit including at least two signal-translating channels, one of these channels being coupled to the first portion of the described impedance network for translating the signals developed in this network and for providing a unidirectional bias potential for the input circuit, and the other of these channels being coupled to the second portion of that network for translating the signals developed therein. The second repeater comprises an electron-discharge tube 27, which may comprise a pentode, having, among others, an anode, a cathode and a control electrode. The control electrode of the tube 27 is conductively connected through one of the channels comprising a resistor 28 and a conductive lead 29 to the junction of the resistors 25 and 26, thereby providing a channel which is coupled to the first portion 26 of the network 24, 25, 26 for translating the signals developed therein and for providing a unidirectional bias potential for the control electrode of the tube 27. The control electrode of the tube 27 is also connected through another channel comprising a condenser 30 to the junction of the resistors 24, 25 and to the anode of the tube 22, thereby being coupled to the second portion 25, 26 of the resistor network 24, 25, 26 for translating signals developed therein. The tube 27 also has an anode load resistor 31 and a cathode load resistor 32.

Unit 16 also comprises a stabilizing circuit for combining the signals translated in each of the described channels to produce in the input circuit of the tube 27 a resultant video signal having a shade level related to the predetermined shade level and for so stabilizing the resultant signal that the last-mentioned shade level is substantially independent of variations of the average amplitude of the first-mentioned video signal. This stabilizing circuit includes a diode rectifier 33 having the condenser 30 in the anode circuit thereof and the resistor 28 coupled between the anode and cathode thereof, thereby effectively being coupled across the resistor 25 and between the two signal-translating channels.

Unit 16 also includes output terminals 34 and 35 for coupling the amplifier 16 to the image-reproducing unit 17.

*Operation of signal-translating system of Fig. 1*

Considering now the operation of the television receiver signal-translating system just described, the video signal which is detected in unit 15 is directly applied to the control electrode of video-frequency amplifier 22 and is amplified by the latter. An amplified video signal therefore is developed across the resistor network 24, 25 and 26. Resistor 24 effectively acts as part of the load resistor between the anode of tube 22 and the source of +B potential, battery 36, and is effectively connected in parallel with the other load resistors 25 and 26 through the voltage divider 37 to ground. The first portion of the resistor network comprising the resistor 26 develops a signal voltage, the amplitude of which is proportioned to be one-fourth that of the amplitude of the signal developed across resistors 25 and 26. The video signal developed across resistors 25 and 26 is applied through the signal-translating channel including condenser 30, in a conventional manner, to the anode of diode rectifier 33.

The relative amplitudes of the components of the video signals present on the anode of tube 22 as functions of the carrier-wave signal level or intermediate-frequency signal level are represented by the series of curves in Fig. 2*a*. In this figure and the series of curves to be described hereinafter in connection with Figs. 2*b*–2*d*, S designates the variation in amplitude of the recurrent or synchronizing-signal components, B the variation in amplitude of the black signal components, and W the variation in amplitude of the white signal components as the intermediate-frequency signal level is varied. The synchronizing signals, as represented by curve S, have a level which corresponds to the maximum amplitude of the received wave signal as measured from a zero reference level or from the white signal level under ideal operating conditions. The black level, represented by curve B, has an amplitude which corresponds to a signal intensity intermediate between that of the maximum amplitude synchronizing signals and the intensity of the white signal.

By the term "maximum amplitude" is meant the greatest signal excursion from a fixed reference level, that is, from the level of the white signals in the curves of Fig. 2. Thus, in the series of curves of Fig. 2*a* the curve S represents the maximum amplitude as measured in a positive direction from the level of curve W of the white signal. Where an oppositely poled signal is derived from the detector and translated through video-frequency amplifier 22, the synchronizing-signal components would again designate the maximum amplitude from the reference level, represented by curve W, but would extend in an opposite direction from that reference. Viewed with respect to the received carrier-wave signal the maximum amplitude is the greatest signal variation from the alternating-current axis.

Referring again to the series of curves of Fig. 2*a*, in accordance with the foregoing definition of a negatively modulated signal, the black level, represented by curve B, represents the maximum amplitude range of the received carrier-wave signal devoted to the transmission of video information. This level extends to 75% of the level of the maximum carrier-wave amplitude represented by curve S. Therefore, the black level corresponds to a predetermined fractional portion of the level of the maximum signal amplitude. The range between the level of curve B and the level of curve S is allotted to the synchronizing information.

Signals having levels of the type described above, as represented by the curves of Fig. 2*a*, are developed across the network 25, 26, the relative proportion of the signal across network 25, 26 which is developed across resistor 26 being represented by the series of curves of Fig. 2*b*. Whereas the group of signals developed across resistors 25 and 26 will occur having potentials which are positive with respect to a reference level of ground or zero potential due to the point on the network 24, 25, 26 at which the anode of tube 22 is connected, the signals developed across resistor 26 will normally occur with potentials which are negative with respect to the same reference level. Therefore, the series of curves of Fig. 2*b* represent signal amplitudes which are similar to those of the curves of Fig. 2*a* but which have relative amplitude values of one-fourth of the latter signals and which occur with negative potentials with respect to ground.

The signals developed across resistor 26 are applied through a signal-translating channel to the cathode of rectifier 33, the no-signal level of this resistor providing a unidirectional bias potential through resistor 28 to the control electrode of tube 27.

Diode 33 in combination with the resistor 28 and the condenser 30 is a stabilization device which, in the absence of any fluctuating or varying signal applied to the cathode thereof, stabilizes the signals applied to its anode with respect to the maximum amplitude level of the applied signals. Therefore, if the cathode of this diode is maintained at a constant potential of substantially zero or ground level, the group of signals represented by the curves of Fig. 2*a*, when translated through condenser 30 and stabilized by rectifier 33, have the form of the series of curves represented by Fig. 2*c* wherein all of the applied signals are stabilized with respect to the maximum signal amplitude level as represented by the amplitude of the synchronizing signals. Thus, the synchronizing-signal level, represented by curve S in the series of curves represented by Fig. 2*c*, is stabilized in such a manner that it is substantially independent of the amplitude variations of the video signals represented by curves B and W.

If stabilization of the type represented by the curves of Fig. 2*c* is employed, this being type of stabilization present in conventional television receivers, while the synchronizing-signal level is stable and independent of amplitude variations of the video signals, the black level represented by curve B of the series of curves of the Fig. 2*c* varies with respect to the synchronizing level as the amplitudes of the received video-frequency signals vary. Thus, for every setting of the contrast control of a television receiver and for every increase in the signal intensity of the video signals, the black level of the signals changes and requires readjustment in order to effect high quality reproduction. This type of arrangement is considered to be undesirable from the viewpoint of the user of the television receiver and the present invention is particularly concerned with an arrangement whereby the signals may be stabilized on the black level instead of on the synchronizing-signal level.

To effect the black-level stabilization or, in other words, to maintain the black level substantially independent of the variations of the average amplitude of the video signal applied to the control electrode of tube 22, rectifier 33 is operated in a manner different from that described above with respect to synchronizing-signal level stabilization. The cathode of tube 33 is not maintained at a constant voltage but varies in accordance with the variation in amplitude of the series of curves of Fig. 2b. That is, as the anode of the rectifier 33 increases in positive potential because of the variation in amplitude of the signals applied thereto, and has a maximum positive potential determined by the maximum amplitude of the synchronizing-signal component of the curves of Fig. 2a, the cathode varies from a negative potential in the direction of zero potential in a manner determined by the maximum amplitude of the synchronizing-signal component represented in the series of curves of Fig. 2b. Therefore, the cathode level of rectifier 33 increases in potential in the same direction as the anode level of this rectifier and a predetermined relationship is maintained between the relative levels of the anode and the cathode of this tube. This relationship is determined by the relative signal intensities of the signals developed across the second portion 25, 26 of the network 24, 25, 26 with respect to the signal intensities of the signals developed across the first portion comprising resistor 26. As has been mentioned above, these portions bear a relationship to one another of four to one effecting a relationship of variation in signal intensity on the anode of diode 33 which is four times that of the variation in signal intensity developed on the cathode of this tube.

Since, as has been mentioned previously, in a negatively modulated system, the back signal lever is 75% of the synchronizing signal or maximum amplitude level, the variation in signal amplitude between the back signal level and the synchronizing-signal level is one-fourth of the variation in signal amplitude between the white level and the synchronizing-signal level. Therefore, if a variation of one-fourth of the total signal level is developed on the cathode of rectifier 33 with respect to the variation in signal level developed on the anode of this tube, the synchronizing-signal level represented by curve S of Fig. 2c will be boosted by an amount of 25% thereby producing in the output of the stabilization device 33 a pattern of video-signal components as represented by the series of curves of Fig. 2d where the black level becomes the stabilized level being substantially independent of the amplitude variations of other video-frequency-signal components. When such stabilization is effected, the synchronizing signal represented by the curve S of Fig. 2d will vary in one sense with respect to the stabilized black signal level and the white signal level will vary in an opposite sense.

The signal components translated through the input circuit of tube 27 and stabilized by means of diode 33 with respect to the black level are then directly applied to the control electrode of tube 27, amplified therein and the amplified signals developed across anode load resistor 31 are applied through terminals 34 and 35 to the image-reproducing unit 17.

Having stabilized the video signals so that the black level of these signals is independent of amplitude variations of the video signal, the operation of the television signal-translating system is then similar to the operation of the conventional television receiver using synchronizing-signal level stabilization. The important difference is that in the present system, when the brightness control of the television receiver has been adjusted for proper black level in the conventional manner, any variation in video-signal amplitude, or any adjustment of contrast that may be made, will not affect the initial black-level adjustment. Thus, with the arrangement described herein it becomes possible to maintain a constant and proper black level in the television receiver regardless of variations in the average amplitudes of signals related to the black level. This desirable feature is obtained without the need for limiting the number of video-amplifier stages that may be used in the television receiver. It will be apparent to those skilled in the art that many video-amplifier stages may be employed if a circuit arrangement of the type described herein with reference to Fig. 1 is used between the different video-frequency amplifier stages.

The embodiment of the invention has been described in connection with a video signal in which the black level corresponds with 75% of the maximum signal amplitude. It is for this reason that the embodiment shows a signal ratio of one to four in the amplitudes of the signals applied to the electrodes of diode 33. It will be understood that the invention is not limited to the translation of a video signal in which the black level corresponds to 75% of the maximum carrier-wave amplitude. Where other signal compositions are used, it is only necessary to proportion the described circuit so that the signal developed in one portion thereof includes a component that has amplitude variations which are related to and vary in substantially the same manner with variations in signal intensity as the level of a selected other signal developed in another portion thereof. Where this operating criterion is satisfied the combination of such signals provides the desired resultant video signal stabilized on its black level.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A television receiver signal-translating system for translating a video-frequency signal having one amplitude level representative of synchronizing-signal peaks while a predetermined fractional portion of said level is representative of black comprising: a source of unidirectional potentials one thereof being positive with respect to a predetermined reference level and another thereof being effectively negative with respect to said reference level; a first video-frequency amplifier for translating said video-frequency signal comprising an electron-discharge device having a plurality of electrodes including an anode and comprising a potential-isolating impedance coupled between said anode and said positive potential source; a potential-divider network including an intermediate terminal and including a pair of terminals one of which is coupled to said anode and the other to said negative potential source, the portion of said network coupled between said negative potential source and said intermediate terminal having an impedance with relation to the total impedance of said network as is the amplitude of said synchronizing signal to the overall amplitude of said video-frequency signal; a second video-frequency amplifier including an input circuit having at least two signal-translating channels one thereof being capacitively coupled to said anode of said first amplifier for translating said video-frequency signal developed across said network and the other of said channels being conductively connected to said intermediate terminal for translating the signal developed in said portion and providing a unidirectional potential for said input circuit; and a signal-stabilizing network comprising a peak-rectifying circuit including a unidirectionally conductive device coupled between said channels and so poled as to conduct upon the application of the peaks of said synchronizing signals thereto and to combine said signals translated in each of said channels, thereby to produce in said input circuit a resultant video-frequency signal having a level representative of said black level and stabilized so that said last-mentioned black level is substantially independent of variations of the average amplitude of said first-mentioned video-frequency signal.

2. A television receiver signal-translating system for translating a video-frequency signal having one amplitude level representative of synchronizing-signal peaks while a predetermined fractional portion of said level is representative of black comprising: a source of unidirectional potentials one thereof being positive with respect to a predetermined reference level and another thereof being effectively negative with respect to said reference level; a first video-frequency amplifier for translating said video-frequency signal comprising an electron-discharge device having a plurality of electrodes including an anode and comprising a potential-isolating impedance coupled between said anode and said positive potential source; a resistor network including an intermediate terminal and including a pair of terminals one of which is coupled to said anode and the other to said negative potential source, the portion of said network coupled between said negative potential source and said intermediate terminal having a resistance with relation to the total resistance of said network as is the amplitude of said synchronizing signal to the overall amplitude of said video-frequency signal; a second video-frequency amplifier including an input circuit having at least two signal-translating channels one thereof being capacitively coupled to said anode of said first amplifier for translating said video-frequency signal developed across said network and the other of said channels being conductively connected to said intermediate terminal for translating the signal developed in said portion and providing a unidirectional potential for said input circuit; and a signal-stabilizing network comprising a peak-rectifying circuit including a unidirectionally conductive device coupled between said channels and so poled as to conduct upon the application of the peaks of said synchronizing signals thereto and to combine said signals translated in each of said channels, thereby to produce in said input circuit a resultant video-frequency signal having a level representative of said black level and stabilized so that said last-mentioned black level is substantially independent of variations of the average amplitude of said first-mentioned video-frequency signal.

3. A television receiver signal-translating system for translating a video-frequency signal having one amplitude level representative of synchronizing-signal peaks while a predetermined fractional portion of said level is representative of black comprising: a source of unidirectional potentials one thereof being positive with respect to chassis ground level and another thereof being effectively negative with respect to said ground; a first video-frequency amplifier for translating said video-frequency signal comprising an electron-discharge device having a plurality of electrodes including an anode and comprising a potential-isolating impedance coupled between said anode and said positive potential source; a potential-divider network including an intermediate terminal and including a pair of terminals one of which is coupled to said anode and the other to said negative potential source, the portion of said network coupled between said negative potential source and said intermediate terminal having an impedance with relation to the total impedance of said network as is the amplitude of said synchronizing signal to the overall amplitude of said video-frequency signal; a second video-frequency amplifier including an input circuit having at least two signal-translating channels one thereof being capacitively coupled to said anode of said first amplifier for translating said video-frequency signal developed across said network and the other of said channels being conductively connected to said intermediate terminal for translating the signal developed in said portion and providing a unidirectional potential for said input circuit; and a signal-stabilizing network comprising a peak-rectifying circuit including a unidirectionally conductive device coupled between said channels and so poled as to conduct upon the application of the peaks of said synchronizing signals thereto and to combine said signals translated in each of said channels, thereby to produce in said input circuit a resultant video-frequency signal having a level representative of said black level and stabilized so that said last-mentioned black level is substantially independent of variations of the average amplitude of said first-mentioned video-frequency signal.

4. A television receiver signal-translating system for translating a video-frequency signal having one amplitude level representative of synchronizing-signal peaks while a predetermined fractional portion of said level is representative of black comprising: a source of unidirectional potentials one thereof being positive with respect to a predetermined reference level and another thereof being effectively negative with respect to said reference level; a first video-frequency amplifier for translating said video-frequency signal comprising an electron-discharge device having a plurality of electrodes including an anode and comprising a potential-isolating impedance coupled between said anode and said positive potential source; a potential-divider network including an intermediate terminal and including a pair of terminals one of which is coupled to said anode and the other to said negative potential source, the portion of said network coupled between said negative potential source and said intermediate terminal having an impedance which is one-quarter of the total impedance of said network as is the amplitude of said synchronizing signal one-quarter of the overall amplitude of said video-frequency signal; a second video-frequency amplifier including an input circuit having at least two signal-translating channels one thereof being capacitively coupled to said anode of said first amplifier for translating said video-frequency signal developed across said network and the other of said channels being conductively connected to said intermediate terminal for translating the signal developed in said portion and providing a unidirectional potential for said input circuit; and a signal-stabilizing network comprising a peak-rectifying circuit including a unidirectionally conductive device coupled between said channels and so poled as to conduct upon the application of the peaks of said synchronizing signals thereto and to combine said signals translated in each of said channels, thereby to produce in said input circuit a resultant video-frequency signal having a level representative of said black level and stabilized so that said last-mentioned black level is substantially independent of variations of the average amplitude of said first-mentioned video-frequency signal.

5. A television receiver signal-translating system for translating a video-frequency signal having one amplitude level representative of synchronizing-signal peaks while a predetermined fractional portion of said level is representative of black comprising: a source of unidirectional potentials one thereof being positive with respect to a predetermined reference level and another thereof being effectively negative with respect to said reference level; a first video-frequency amplifier for translating said video-frequency signal comprising an electron-discharge device having a plurality of electrodes including an anode and comprising a potential-isolating impedance coupled between said anode and said positive potential source; a potential-divider network including an intermediate terminal and including a pair of terminals one of which is coupled to said anode and the other to said negative potential source, the portion of said network coupled between said negative potential source and said intermediate terminal having an impedance with relation to the total impedance of said network as is the amplitude of said synchronizing signal to the overall amplitude of said video-frequency signal; a second video-frequency amplifier including an input circuit having at least two signal-translating channels one thereof being capacitively coupled to said anode of said first amplifier for translating said video-frequency signal developed across said network and the other of said channels being conductively connected to said intermediate terminal for translating the signal developed in said portion and providing a unidirectional bias potential with respect to said predetermined level for said input circuit; and a signal-stabilizing network comprising a peak-rectifying circuit including a diode having the anode thereof coupled to said one channel and the cathode coupled to said intermediate terminal thus being so poled as to conduct upon the application of the peaks of said synchronizing signals to said anode of said diode and to combine said signals translated in each of said channels, thereby to produce in said input circuit a resultant video-frequency signal having a level representative of said black level and stabilized so that said last-mentioned black level is substantially independent of variations of the average amplitude of said first-mentioned video-frequency signal.

WILLIAM F. BAILEY.

REFERENCES CITED

The following references are of record in the file of this patent:

UNITED STATES PATENTS

| Number | Name | Date |
|---|---|---|
| 2,240,281 | Ballard | Apr. 29, 1941 |
| 2,259,520 | Freeman | Oct. 21, 1941 |
| 2,463,735 | Bedford | Mar. 8, 1949 |

FOREIGN PATENTS

| Number | Country | Date |
|---|---|---|
| 515,426 | Great Britain | Dec. 5, 1939 |